US011402133B2

(12) United States Patent
Choi et al.

(10) Patent No.: US 11,402,133 B2
(45) Date of Patent: Aug. 2, 2022

(54) GAS HEAT PUMP SYSTEM

(71) Applicant: LG ELECTRONICS INC., Seoul (KR)

(72) Inventors: Joongkeun Choi, Seoul (KR); Tae Kyung Kim, Seoul (KR); Sung Bae Song, Seoul (KR); Young Gyu Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 212 days.

(21) Appl. No.: 16/957,872

(22) PCT Filed: Dec. 10, 2018

(86) PCT No.: PCT/KR2018/015640
§ 371 (c)(1),
(2) Date: Jun. 25, 2020

(87) PCT Pub. No.: WO2019/132321
PCT Pub. Date: Jul. 4, 2019

(65) Prior Publication Data
US 2020/0340713 A1    Oct. 29, 2020

(30) Foreign Application Priority Data
Dec. 26, 2017  (KR) .......................... 10-2017-0179643

(51) Int. Cl.
*F02M 21/02*    (2006.01)
*F25B 1/04*    (2006.01)
(Continued)

(52) U.S. Cl.
CPC ................ *F25B 1/04* (2013.01); *F02B 37/18* (2013.01); *F02B 39/10* (2013.01); *F02B 39/16* (2013.01);
(Continued)

(58) Field of Classification Search
CPC .............................. F02M 21/023; F02B 39/16
See application file for complete search history.

(56) References Cited

U.S. PATENT DOCUMENTS 3,577,726 A    5/1971   Wagner
3,910,049 A *  10/1975  Lloyd .................... F02M 33/04
                                                  60/605.1
2007/0034195 A1  2/2007  Wijk et al.

FOREIGN PATENT DOCUMENTS

EP    3 150 938    4/2017
FR    3 044 042    5/2017
(Continued)

OTHER PUBLICATIONS

European Search Report issued in Application No. 18897332.5 dated Jul. 27, 2021.
(Continued)

*Primary Examiner* — Ngoc T Nguyen
(74) *Attorney, Agent, or Firm* — KED & Associates LLP

(57)    ABSTRACT

The present invention relates to a gas heat pump system. A gas heat pump system according to one embodiment of the present invention comprises: a compressor for compressing a refrigerant; a gas engine for driving the compressor; a mixer for mixing air and fuel to generate a mixed gas to be supplied to the gas engine; a mixed gas supply line connected between the mixer and the gas engine; and a supercharger for supercharging the mixed gas supplied to the gas engine through the mixed gas supply line, wherein the supercharger comprises a sealed housing formed by sealing the remaining parts thereof other than an inlet port and an outlet port through which the mixed gas moves into and out of the housing, and a bypass line is provided between the sealed housing and the inlet port of the supercharger so as to resupply a mixed gas in the sealed housing to the inlet port of the supercharger. Therefore, the system can prevent a (Continued)

safety-related accident resulting from the leakage of the mixed gas out of the supplier and can reduce the amount of fuel consumption.

20 Claims, 5 Drawing Sheets

(51) Int. Cl.
    *F02B 37/18*     (2006.01)
    *F02B 39/10*     (2006.01)
    *F02M 21/04*     (2006.01)
    *F02B 39/16*     (2006.01)
    *F02D 41/14*     (2006.01)

(52) U.S. Cl.
    CPC .......... *F02M 21/023* (2013.01); *F02M 21/04* (2013.01); *F02D 41/14* (2013.01)

(56) References Cited

FOREIGN PATENT DOCUMENTS

| | | |
|---|---|---|
| JP | 2000-008961 | 1/2000 |
| JP | 2005-201243 | 7/2005 |
| JP | 2013-087716 | 5/2013 |
| JP | 2013-257072 | 12/2013 |
| KR | 10-1991-0008320 | 5/1991 |
| KR | 10-2013-0028332 | 3/2013 |
| KR | 10-2014-0129407 | 11/2014 |

OTHER PUBLICATIONS

International Search Report (with English Translation) dated Mar. 28, 2019 issued in Application No. PCT/KR2018/015640.
Korean Office Action issued in Application No. 10-2017-0179643 dated Jun. 17, 2022.

\* cited by examiner

GAS HEAT PUMP SYSTEM

CROSS-REFERENCE TO RELATED PATENT APPLICATIONS

This application is a U.S. National Stage Application under 35 U.S.C. § 371 of PCT Application No. PCT/KR2018/015640, filed Dec. 10, 2018, which claims priority to Korean Patent Application No. 10-2017-0179643, filed Dec. 26, 2017, whose entire disclosures are hereby incorporated by reference.

TECHNICAL FIELD

The present disclosure relates to a gas heat pump system, and more particularly, to a gas heat pump system capable of bypassing leakage mixed gas leaking from an air fuel mixed gas supercharger to be reused.

BACKGROUND ART

A gas heat pump (GHP) system is a new gas cooling and heating apparatus to heat and cool with a gas engine.

A heat pump refers to a heat pump system to change a circulating direction of refrigerant between an indoor unit and an outdoor unit and operate as a cooler in summer and a heater in winter.

Refrigerant is circulated by a compressor. A heat pump to drive the compressor by an electric motor is referred to as "an electric driven heat pump (EHP)". A heat pump to drive a compressor by a gas engine is referred to as "a gas engine driven heat pump" (i.e., "a gas heat pump").

Gas heat pumps perform comfortable and fast cooling and heating compared to electric driven heat pumps in that gas heat pumps cool and heat by the gas engine.

FIG. 1 is a schematic view showing a gas heat pump system in related art.

Referring to FIG. 1, a gas heat pump system 10 in related art includes a compressor 11, a gas engine 12 configured to drive the compressor, a mixer 16 configured to generate mixed gas, and a supercharger 20. When air (a) and fuel (f) are each supplied to the mixer 16, the mixer 16 mixes the air (a) with the fuel (f) to generate the mixed gas G. The mixed gas G is supplied to and supercharged to the supercharger 20 along a mixed gas supply line 13. Thereafter, the mixed gas G is supplied to the gas engine 12 via an intercooler 19 and an engine controller (ETC) 18. The gas engine 12 drives the compressor 11 using the supplied mixed gas G and discharges exhaust gas EG.

FIG. 2 is a schematic view showing a supercharger of a gas heat pump in related art.

Referring to FIG. 2, a supercharger 20 in related art includes an inlet port 23 configured to introduce a mixed gas (G_in) and an outlet port 25 configured to discharge high-pressure mixed gas (G_out). Specifically, the supercharger 20 in related art includes an impeller 28 configured to compress and discharge the introduced mixed gas, a motor 29 configured to rotate the impeller 28, and a housing 21 configured to surround and accommodate the motor 29.

When the supercharger is operated at a high rotational speed, some of the high-pressure mixed gas leaks toward the housing 21 through a fine gap between a rotary shaft 29a and a bearing 29b, and the rotary shaft 29a and the bearing 29b each connect the impeller 28 to the motor 29. This is referred to as "leakage mixed gas". There is a fear that the leakage mixed gas leaks out to outside through the housing 21.

As described above, the mixed gas leaks, which results in various safety accidents such as an explosion or human gas intake. Therefore, there is a need for a method of preventing the above configuration.

DISCLOSURE

Technical Problem

The present disclosure provides a gas heat pump system configured to prevent safety accidents which results from leakage of mixed gas from a supercharger and to reduce fuel consumption by reusing leakage mixed gas.

The objects of the present disclosure are not limited to the above-mentioned objects, and the other objects and advantages of the present disclosure, which are not mentioned, may be understood by the following description, and more clearly understood by the embodiments of the present disclosure. It is also readily understood that the objects and the advantages of the present disclosure may be implemented by features described in appended claims and a combination thereof.

Technical Solution

According to an embodiment of the present disclosure, a gas heat pump system includes a compressor configured to compress a refrigerant, a gas engine configured to drive the compressor, a mixer configured to mix air with fuel to generate mixed gas supplied to the gas engine, a mixed gas supply line configured to be connected between the mixer and the gas engine, and a supercharger configured to supercharge the mixed gas supplied to the gas engine through the mixed gas supply line. The supercharger includes a closed housing with a closed portion at remaining portions other than an inlet port through which the mixed gas is introduced and an outlet port through which the mixed gas is discharged and a bypass line may be disposed between the closed housing and the inlet port of the supercharger to resupply the mixed gas in the closed housing to the inlet port of the supercharger.

In this case, the bypass line may further include a check valve to block backflow of the mixed gas from the mixed gas supply line toward the closed housing.

In addition, a first end of the bypass line may be connected to the closed housing and a second end thereof may be connected to the mixed gas supply line connected to the inlet port of the supercharger.

In addition, the gas heat pump system may further include an air-fuel ratio sensor between the second end of the bypass line and the inlet port of the supercharger. The air-fuel ratio sensor may detect the air-fuel ratio of the mixed gas flowing into the supercharger through the mixer and the bypass line.

In addition, the gas heat pump system may further include a fuel amount control valve to adjust an amount of fuel supplied to the mixer. When the air-fuel ratio detection value of the mixed gas detected by the air-fuel ratio sensor is different from a set reference value, the fuel amount control valve may be controlled to adjust the amount of fuel supplied to the mixer.

In addition, the second end of the bypass line is connected to one side of the mixed gas supply line connected toward the inlet port of the supercharger from the mixer and may be connected to have an acute angle with respect to a flow direction of the mixed gas.

Advantageous Effects

According to an embodiment of the present disclosure, a supercharger includes a closed housing to prevent leakage of mixed gas from the supercharger.

In addition, according to an embodiment of the present disclosure, the mixed gas stored in the closed housing bypass flows to a mixed gas supply line to prevent various safety accidents caused by leakage of the mixed gas and to reduce fuel consumption.

Further effects of the present disclosure, in addition to the above-mentioned effects, are described together while describing specific matters to implement the present disclosure.

BEST MODE

Figure 1:
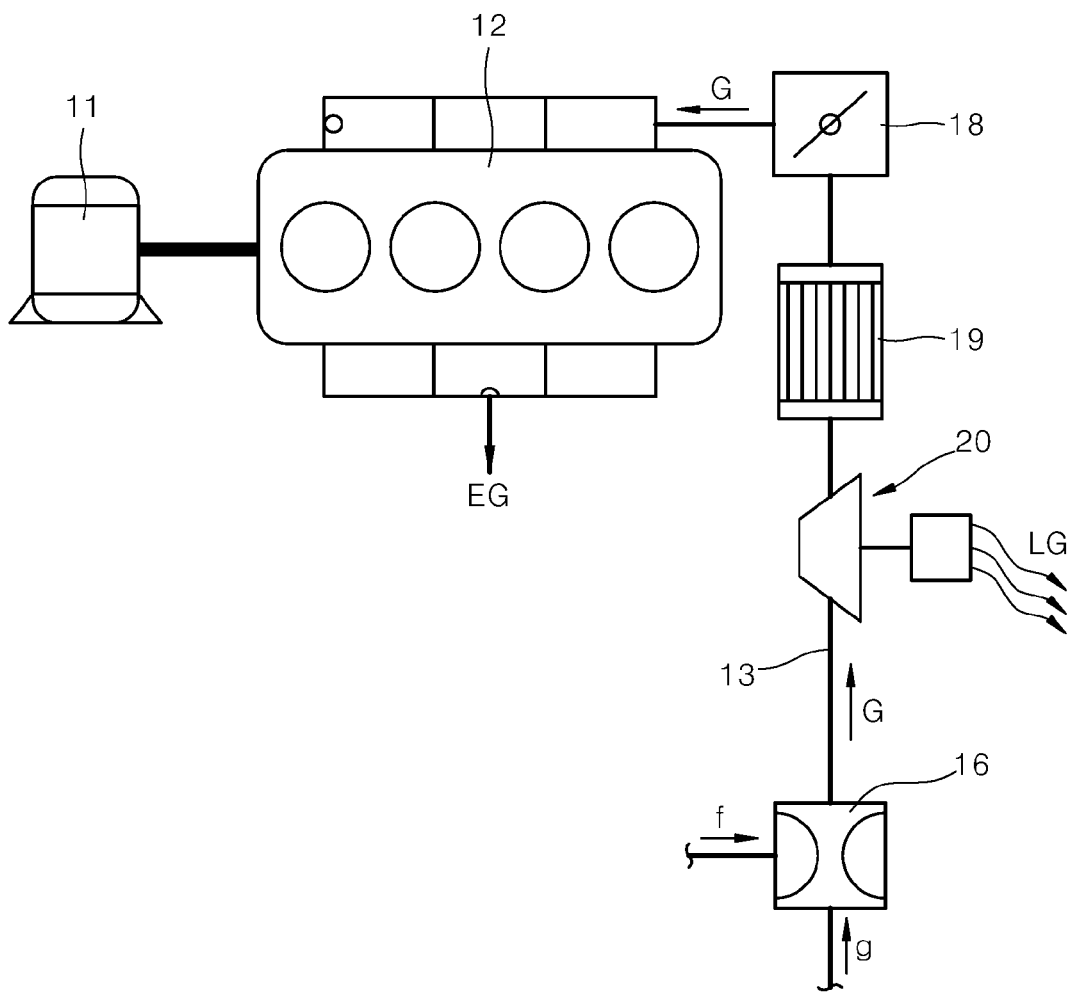
FIG. 1 is a conceptual schematic diagram showing a gas heat pump system in related art.

Hereinafter, embodiments will be described in detail with reference to the accompanying drawings such that a person having ordinary skill in the art to which the present disclosure pertains can easily implement the present disclosure. The present disclosure can be implemented in different manners and is not limited to embodiments set forth herein.

A part which is not relevant to the description is omitted to clearly describe an exemplary embodiment of the present invention. Same reference numerals can be used to refer to same or similar components throughout the present disclosure. Further, some embodiments of the present disclosure are described in detail with reference to exemplary drawings. Reference now should be made to the drawings, in which the same reference numerals are used throughout the different drawings to designate the same or similar components. In the description of the present disclosure, a detailed description of a well-known configuration or technology relating to the present disclosure may be omitted if it unnecessarily obscures the gist of the present disclosure.

Further, the terms "connected," "coupled," or the like are used such that, where a first component is connected or coupled to a second component, the first component may be directly connected or able to be connected to the second component, or one or more additional components may be disposed between the first and second components, or the first and second components may be connected or coupled through one or more additional components.

In the following description, the term "heat pump" refers to a heat pump system configured to change a direction of refrigerant circulating between an indoor unit and an outdoor unit and operate as a cooler in summer and operate as a heater in winter.

"A gas heat pump (GHP) system" drives a compressor by a gas engine and performs cooling and heating using compressed refrigerant.

"A supercharger" supercharges air and fuel to a gas engine and compresses and supplies mixed gas introduced by rotating an impeller through driving of a motor.

Figure 3:
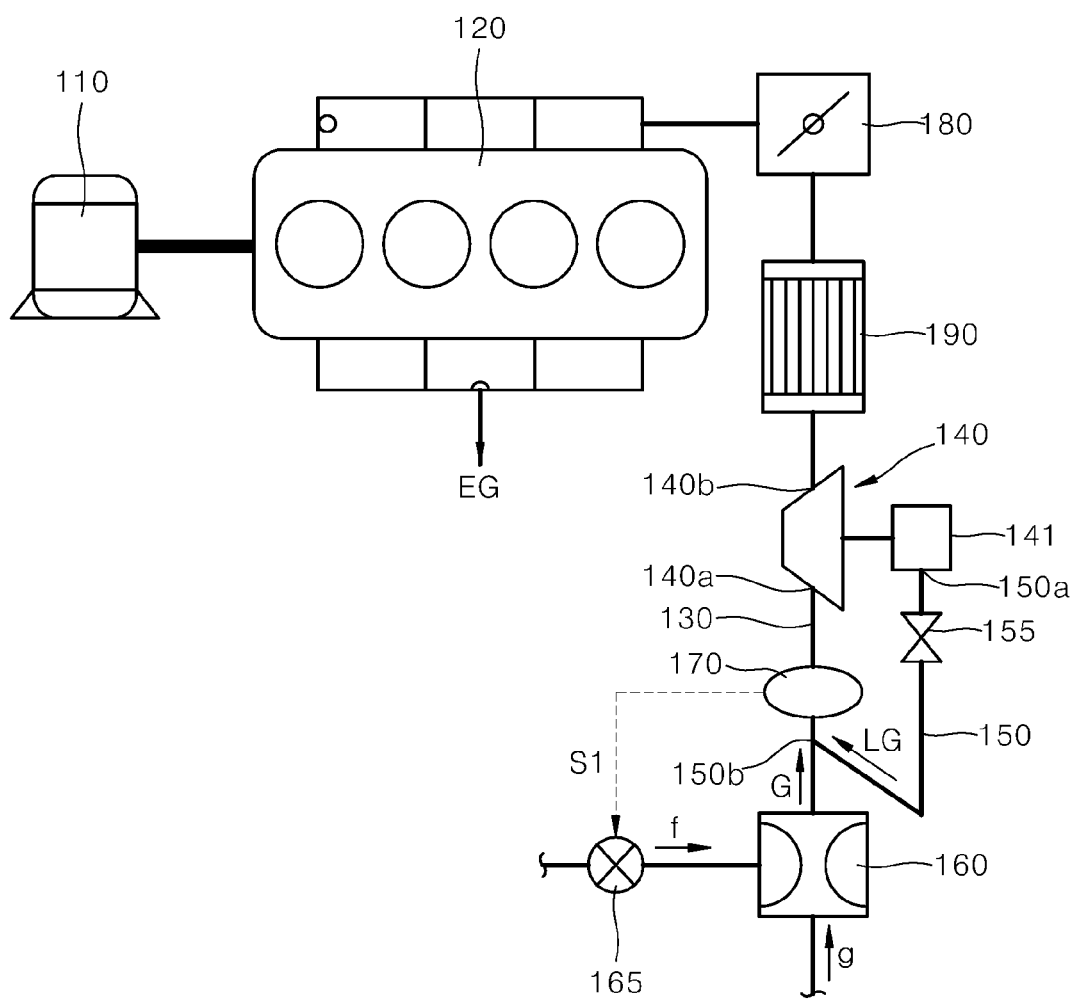
FIG. 3 is a conceptual schematic diagram showing a gas heat pump system according to an embodiment of the present disclosure.

FIG. 3 is a conceptual schematic diagram showing a gas heat pump system according to an embodiment of the present disclosure.

Referring to FIG. 3, an illustrated gas heat pump system 100 includes a compressor 110, a gas engine 120, a mixed gas supply line 130, a supercharger 140, and a mixer 160.

In this case, in the gas heat pump system 100 according to an embodiment of the present disclosure, the supercharger 140 includes a closed housing 140.

In addition, the gas heat pump system 100 may further include a bypass line 150 to supply mixed gas (hereinafter; referred to as "leakage mixed gas") stagnated inside the closed housing 141 toward the mixed gas supply line 130 to be reused.

The compressor 110 is powered from the gas engine 120 to be driven.

For example, the compressor 110 compresses a low-temperature and low-pressure gas refrigerant to generate a high-temperature and high-pressure gas refrigerant to be supplied and a refrigerant is circulated according to a refrigeration cycle in which the refrigerant passes through an outdoor heat exchanger, an expansion valve, and an indoor heat exchanger by driving the compressor 110.

The gas engine 120 drives the compressor 110 using the mixed gas (G).

Specifically, an output shaft of the gas engine 120 is connected to a driving shaft of the compressor 110 to drive the compressor 120, but is not limited thereto.

The mixer 160 generates the mixed gas (G).

For example, the mixer 160 mixes air (g) with fuel (f) supplied through different paths.

As described above, the gas generated by mixing the air (g) with the fuel (f) by the mixer 160 is referred to as "mixed gas (G)", which may be supplied to the gas engine 120 to be used.

The mixed gas supply line 130 refers to a pipe that supplies the mixed gas (G) generated by the mixer 160 to the gas engine 120.

The mixed gas supply line 130 is not necessarily the same as that shown in FIG. 3, but may have other shapes.

The mixed gas G generated by the mixer 160 may be supplied to the gas engine 120 through the mixed gas supply line 130 and the supercharger 140.

The supercharger 140 supercharges the mixed gas G supplied to the gas engine 120 through the mixed gas supply line 130.

The supercharger 140 includes an inlet port 140a to introduce the mixed gas G and an outlet port 140b to discharge the mixed gas G introduced through the inlet port 140a at high pressure.

For example, the supercharger 140 includes an impeller to compress the mixed gas G introduced into the inlet port 140a with high temperature and a motor and the supercharger 140 according to an embodiment of the present disclosure further includes a closed housing 141 to block a motor from outside.

Figure 2:
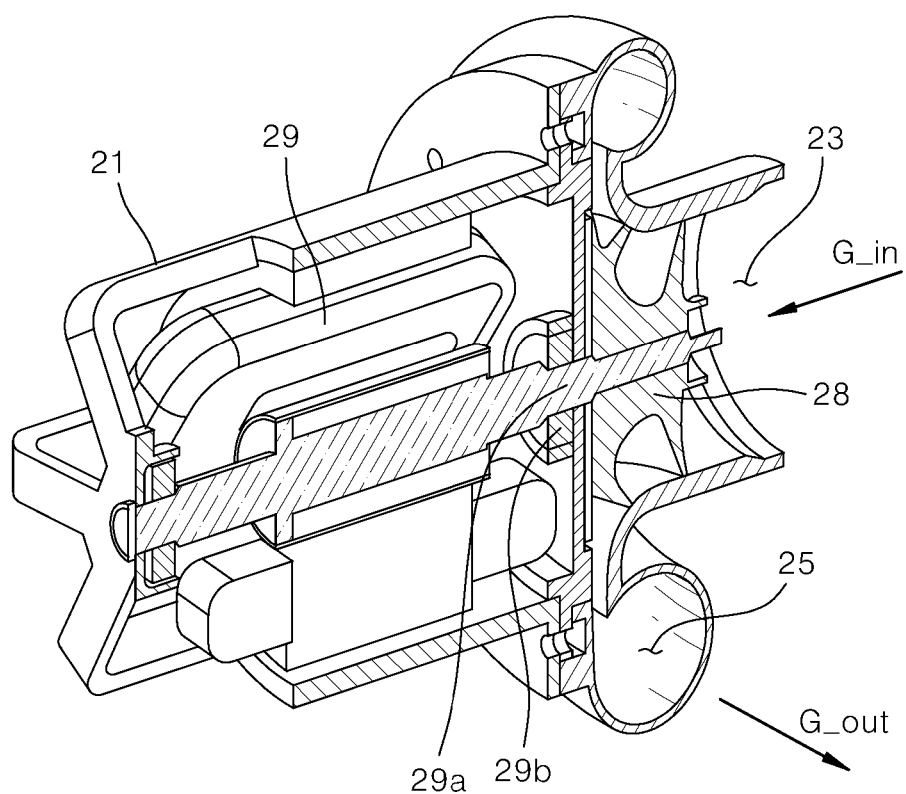
FIG. 2 schematically shows a supercharger in related art.

In some cases where the supercharger 140 is operated with a high rotation speed, some of the mixing gas (G) leaks toward a housing via a gap between a rotary shaft 29a (see FIG. 2) and/or a bearing 29b (see FIG. 2) for connecting internal components such as the impeller and the motor.

The leaked compressed gas is referred to as "leakage compressed gas (LG)". The leakage compressed gas (LG) leaks to outside, which results in various safety accidents such as explosion.

Accordingly, in the present disclosure, the supercharger 140 includes the closed housing 141 to block the leakage mixed gas LG from leaking to the outside.

Figure 4:
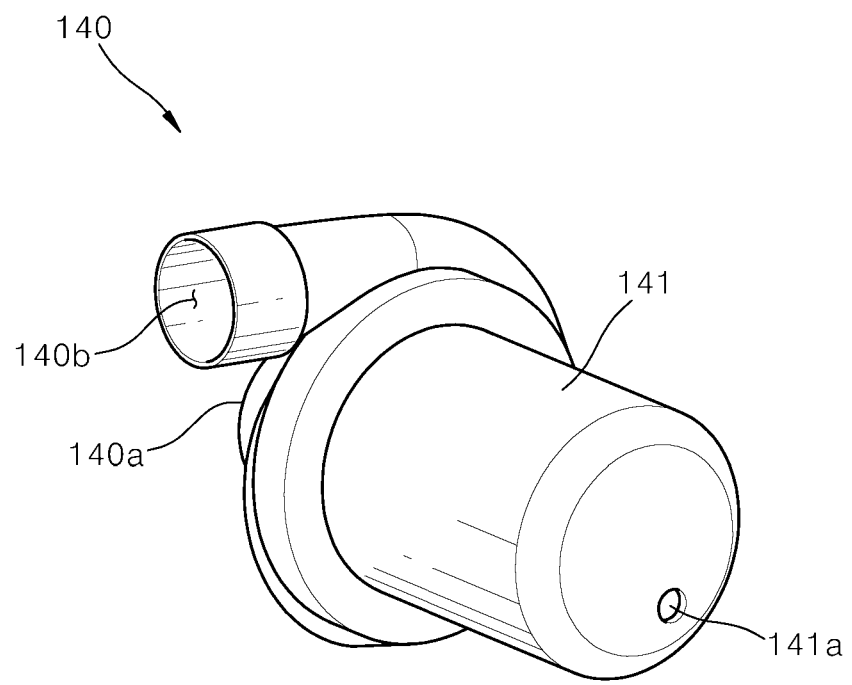
FIG. 4 is a schematic view showing a closed housing of a supercharger according to an embodiment of the present disclosure.

As shown in FIG. 4, the closed housing 141 has a closed portion at a remaining portion (i.e., a remainder) other than an inlet port 140*a* through which the mixed gas flows into the supercharger 140 and an outlet port 140*b* through which the mixed gas is discharged at a high pressure.

Referring to FIG. 4, the closed housing 141 may have a cylindrical can shape, but is not necessarily limited to thereto.

Meanwhile, the closed housing 141 may further provide at least one connecting hole 141*a* at a side of the closed housing 141 to be connected to a bypass line 150 (see FIG. 3) described below. The leakage mixed gas LG (see FIG. 3) stagnated in the closed housing 141 may be recovered through the bypass line 150 (see FIG. 3) to be supplied again through the mixed gas supply line 130.

The bypass line 150 recovers the leakage mixed gas LG which is leaked into and stagnated in the closed housing 141 of the above-described supercharger 140 toward the mixed gas supply line 130 and supplies the recovered leakage mixed gas LG back to the inlet port 140*a* of the supercharger 140.

Specifically, the bypass line 150 may be connected between the closed housing 141 and the mixed gas supply line 130 connected to the inlet port 140*a* of the supercharger 140.

Accordingly, when the supercharger 140 is operated, the leakage mixed gas LG collected into the closed housing 141 may be recovered toward the mixed gas supply line 130 along the bypass line 150 to be reused.

There is a problem in that the mixed gas (G) flowing to the inlet port 140*a* of the supercharger 140 through the mixed gas supply line 130 may reversely flow into the closed housing 141 through the bypass line 150.

Therefore, according to the embodiment of the present disclosure, in the gas heat pump system 100, the bypass line 150 may further include a check valve 155.

A check valve 155 prevents the mixed gas G, which flows along the mixed gas supply line 130 from the mixer 160 toward the inlet port 140*a* of the supercharger 140, from flowing through the bypass line 150 and reversely flowing toward the closed housing 141.

At least one check valve 155 may be provided. Referring to FIG. 3, the bypass line 150 includes a single check valve 155, but is not limited thereto.

Specifically, the first end 150*a* of the bypass line 150 is connected to the closed housing 141 and the second end 150*b* of the bypass line 150 is connected to the mixed gas supply line 130 connected to the inlet port 140*a* of the supercharger 140, but the present disclosure is not limited to the illustrated configuration.

According to the configuration as described above, the mixed gas G generated by the mixer 160 and the leakage mixed gas LG collected into the closed housing 141 may be supplied through the inlet port 140*a* of the supercharger 140 to reduce fuel consumption.

Meanwhile, according to an embodiment of the present disclosure, the gas heat pump system 100 further includes an air-fuel ratio sensor 170 between the second end 150*b* of the bypass line 150 and the inlet port of the supercharger 140.

The air-fuel ratio sensor 170 detects an air-fuel ratio when the mixed gas G, which is mixed with the leakage mixed gas LG recovered from the closed housing 141 through the bypass line 150, is supplied to the inlet port 140*a* of the supercharger 140.

In this case, the air-fuel ratio sensor 170 may detect the air-fuel ratio in real time or at a predetermined time interval.

Meanwhile, the gas heat pump system 100 may further include a fuel amount control valve 165 configured to adjust the amount of fuel f supplied to the mixer 160 (hereinafter, the amount of fuel).

When an air-fuel ratio detection value of the mixed gas G detected by the air-fuel ratio sensor 170 is different from a set reference value, the air-fuel ratio sensor 170 applies a control signal Si to the fuel amount control valve 165.

Thereafter, the amount of fuel supplied to the mixer 160 may be adjusted under the control of the fuel amount control valve 165.

As a result, it is possible to actively respond to changes in air-fuel ratio by the leakage mixed gas (LG) recovered through the bypass line 150.

In addition, the fuel amount may be constantly controlled to match the air-fuel ratio detected by the air-fuel ratio sensor 170 with a target air-fuel ratio (e.g., a set reference value).

Meanwhile, according to an embodiment of the present disclosure, the bypass line 150 of the gas heat pump system 100 may be connected for the second end 150*b* to form an acute angle with respect to a flow direction of the mixed gas (G).

Figure 5:
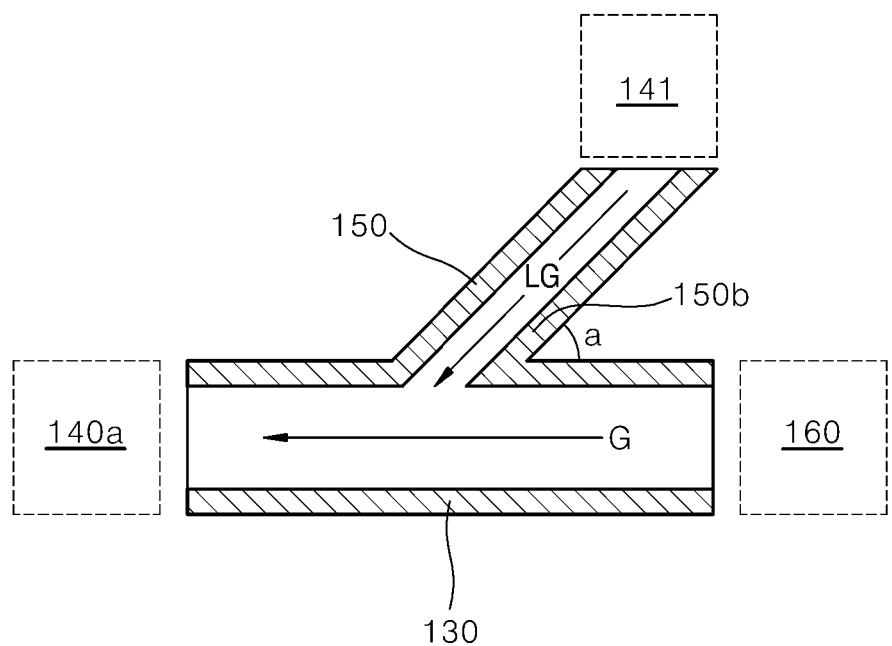
FIG. 5 is a schematic view showing connection between a mixed gas supply line and a bypass line according to an embodiment of the present disclosure.

FIG. 5 is a schematic view showing connection between a mixed gas supply line and a bypass line according to an embodiment of the present disclosure.

Referring to FIG. 5, a mixed gas supply line 130 is connected between a mixer 160 to generate the mixed gas G and an inlet port 140*a* of a supercharger and the mixed gas G flows through the mixed gas supply line 130 (e.g., the mixed gas flow direction is referred to as "a main flow direction").

Meanwhile, the second end 150*b* of the bypass line 150 is connected to one side of the mixed gas supply line 130. In this case, an angle (a) in which the second end 150*b* of the bypass line 150 is connected may be an acute angle.

Accordingly, the mixed gas G flowing in the main flow direction may be prevented from flowing back to the second end 150*b* of the bypass line 150.

Interference between the mixed gas G flowing in the main flow direction and the leakage mixed gas LG flowing through the bypass line 150 may also be reduced.

Referring back to FIG. 3, the leakage mixed gas LG leaked from the supercharger 140 and stored in the closed housing 141 is supplied and supercharged to the supercharger 140 with an appropriate amount of fuel through the control of the air-fuel ratio, with the mixed gas G mixed by the mixer 160.

Meanwhile, the high-pressure mixed gas (G) that has passed through the supercharger 140 is supplied to the gas engine 120 via an intercooler 190 and an engine controller (ETC).

Thereafter, the compressor 110 may be driven by the operation of the gas engine 120.

As described above, according to the configuration and operation of the present disclosure, the supercharger includes the closed housing to prevent the mixing gas from leaking to outside, which has leaked through the rotary shaft and the bearing of the motor.

Accordingly, a risk of various safety accidents that may occur due to the leakage of the mixed gas to the outside may be prevented in advance.

Furthermore, the mixing gas stored in the closed housing bypass flows to the mixed gas supply line and reuses the mixing gas to reduce the fuel consumption of the gas heat pump to improve heating and cooling efficiency.

Although the present disclosure has been described as described above with reference to exemplary drawings, the present disclosure is not limited to the embodiments and drawings disclosed herein, and various modifications can be made by those skilled in the art within the scope of the technical idea of the present disclosure. Further, even if working effects obtained based on configurations of the present disclosure are not explicitly described in the description of embodiments of the present disclosure, effects predictable based on the corresponding configuration have to be recognized.

The invention claimed is:

1. A gas heat pump system, comprising:
   a compressor configured to compress a refrigerant;
   a gas engine configured to drive the compressor;
   a mixer configured to mix air with fuel to generate mixed air supplied to the gas engine;
   a mixed gas supply line configured to be connected between the mixer and the gas engine;
   a supercharger configured to supercharge the mixed gas supplied to the gas engine through the mixed gas supply line;
   wherein the supercharger comprises a closed housing with a closed portion at a remaining portion other than an inlet port through which the mixed gas is introduced and an outlet port through which the mixed gas is discharged; and
   wherein a bypass line is disposed between the closed housing and the inlet port of the supercharger to resupply the mixed gas in the closed housing to the inlet port of the supercharger.

2. The gas heat pump system of claim 1, wherein the bypass line further comprises a check valve configured to prevent backflow of the mixed gas toward the closed housing from the mixed gas supply line.

3. The gas heat pump system of claim 1, wherein a first end of the bypass line is connected to the closed housing and a second end of the bypass line is connected through the mixed gas supply line connected to the inlet port of the supercharger.

4. The gas heat pump system of claim 3, further comprising an air-fuel ratio sensor between the second end of the bypass line and the inlet port of the supercharger,
   wherein the air-fuel ratio sensor is configured to detect the air-fuel ratio of the mixed gas flowing into the supercharger through the mixer and the bypass line.

5. The gas heat pump system of claim 4, further comprising a fuel amount control valve configured to adjust the amount of fuel supplied to the mixer.

6. The gas heat pump system of claim 3, wherein the second end of the bypass line is connected to one side of the mixed gas supply line connected to the inlet port of the supercharger from the mixer.

7. The gas heat pump system of claim 4, wherein the air-fuel ratio sensor is configured to detect the air-fuel ratio of the mixed gas flowing into the supercharger through the mixer and the bypass line.

8. The gas heat pump system of claim 5, wherein, when the air-fuel ratio detection value of the mixed gas detected by the air-fuel ratio sensor is different from a set reference value, the gas heat pump system is configured to control the fuel amount control valve to adjust an amount of fuel supplied to the mixer.

9. The gas heat pump system of claim 8, wherein the second end of the bypass line is connected to form an acute angle with respect to a flow direction of the mixed gas.

10. The gas heat pump system of claim 1, wherein the closed housing has a cylindrical can shape and has a closed portion at remaining portions other than the inlet port through which the mixed gas is introduced to the supercharger and the outlet port through which the mixed gas is discharged with high pressure.

11. A gas heat pump system, comprising:
    a compressor configured to compress a low-temperature and low-pressure gas refrigerant and supply a high-temperature and high-pressure gas refrigerant;
    a gas engine configured to operate the compressor, the gas engine comprising an output shaft connected to a driving shaft of the compressor;
    a mixer configured to mix air with fuel to generate mixed gas supplied to the gas engine;
    a mixed gas supply line configured to be connected between the mixer and the gas engine;
    a supercharger configured to supercharge mixed gas supplied to the gas engine through the mixed gas supply line;
    wherein the supercharger comprises a closed housing with a closed portion at remaining portions other than an inlet port through which the mixed gas is introduced and an outlet port through which the mixed gas is discharged; and
    wherein a bypass line is disposed between the closed housing and the inlet port of the supercharger to re-supply the mixed gas in the closed housing to the inlet port of the supercharger.

12. The gas heat pump system of claim 11, wherein the bypass line further comprises a check valve configured to prevent backflow of the mixed gas toward the closed housing from the mixed gas supply line.

13. The gas heat pump system of claim 11, wherein the bypass line has a first end connected to the closed housing and a second end connected to the mixed gas supply line connected to the inlet port of the supercharger.

14. The gas heat pump system of claim 13, further comprising an air-fuel ratio sensor between the second end of the bypass line and the inlet port of the supercharger.

15. The gas heat pump system of claim 14, wherein the air-fuel ratio sensor is configured to detect the air-fuel ratio of the mixed gas flowing into the supercharger through the mixer and the bypass line.

16. The gas heat pump system of claim 14, further comprising a fuel amount control valve configured to adjust the amount of fuel supplied to the mixer.

17. The gas heat pump system of claim 16, wherein, when an air-fuel ratio detection value of the mixed gas detected by the air-fuel ratio sensor is different from a set reference value, the gas heat pump system is configured to control the fuel amount control valve to adjust the fuel amount supplied to the mixer.

18. The gas heat pump system of claim 13, wherein the second end of the bypass line is configured to be connected to one side of the mixed gas supply line connected to the inlet port of the supercharger from the mixer.

19. The gas heat pump system of claim 18, wherein the second end of the bypass line is configured to be connected to form an acute angle with respect to a flow direction of the mixed gas.

20. The gas heat pump system of claim 11, wherein the closed housing has a cylindrical can shape and has a closed portion at remaining portions other than the inlet port through which the mixed gas is introduced into the supercharger and the outlet port through which the mixed gas is discharged with high pressure.

\* \* \* \* \*